(12) United States Patent
Zhang et al.

(10) Patent No.: US 9,679,595 B1
(45) Date of Patent: Jun. 13, 2017

(54) THERMAL ASPERITY DETECTION APPARATUS AND METHOD

(71) Applicant: Seagate Technology LLC, Cupertino, CA (US)

(72) Inventors: Lihong Zhang, Singapore (SG); Xiong Liu, Singapore (SG); Samuel Gan, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/085,559

(22) Filed: Mar. 30, 2016

(51) Int. Cl.
| G11B 19/04 | (2006.01) |
| G11B 5/55 | (2006.01) |
| G11B 5/00 | (2006.01) |
| G11B 20/18 | (2006.01) |
| G11B 5/012 | (2006.01) |

(52) U.S. Cl.
CPC .......... G11B 5/5565 (2013.01); G11B 19/041 (2013.01); G11B 19/048 (2013.01); *G11B 5/012* (2013.01); *G11B 20/1883* (2013.01); *G11B 20/1889* (2013.01); *G11B 2005/0021* (2013.01)

(58) Field of Classification Search
None
See application file for complete search history.

(56) References Cited

U.S. PATENT DOCUMENTS

| 6,265,869 B1 | 7/2001 | Takahashi |
| 6,335,840 B1 | 1/2002 | Malone |
| 6,389,571 B1 | 5/2002 | Yang et al. |
| 6,421,193 B1 | 7/2002 | Li |
| 6,754,015 B2 | 6/2004 | Erden et al. |
| 6,920,001 B2 | 7/2005 | Chua et al. |
| 6,940,669 B2 | 9/2005 | Schaenzer et al. |
| 2008/0278838 A1 | 11/2008 | Le |

*Primary Examiner* — Brian Butcher
(74) *Attorney, Agent, or Firm* — Hollingsworth Davis, LLC (57) ABSTRACT

A method comprises sensing for thermal asperities while sequentially scanning a plurality of tracks of a magnetic recording medium in a first direction relative to an inner or outer diameter of the medium. The method comprises halting the scanning at a first track in response to detecting a thermal asperity at the first track, and skipping a predetermined number of tracks in the first direction to a second track. The method also comprises sensing for the thermal asperity while sequentially scanning the plurality of tracks beginning with the second track in a second direction opposite the first direction. The method further comprises halting the scanning at a third track in response to detecting the thermal asperity at the third track, and logging the first and third tracks as tracks between which the thermal asperity is located.

20 Claims, 8 Drawing Sheets

THERMAL ASPERITY DETECTION APPARATUS AND METHOD

SUMMARY

Embodiments of the disclosure are directed to a method comprising sensing for thermal asperities while sequentially scanning a plurality of tracks of a magnetic recording medium in a first direction relative to an inner or outer diameter of the medium. The method comprises halting the scanning at a first track in response to detecting a thermal asperity at the first track, and skipping a predetermined number of tracks in the first direction to a second track. The method also comprises sensing for the thermal asperity while sequentially scanning the plurality of tracks beginning with the second track in a second direction opposite the first direction. The method further comprises halting the scanning at a third track in response to detecting the thermal asperity at the third track, and logging the first and third tracks as tracks between which the thermal asperity is located.

Other embodiments are directed to an apparatus comprising a recording head which includes a thermal asperity sensor configured to sense for thermal asperities of a magnetic recording medium moving relative to the head. A controller is coupled to the head and configured to sense for the thermal asperities while sequentially scanning a plurality of tracks of the medium in a first direction relative to an inner or outer diameter of the medium. The controller is also configured to halt the scanning at a first track in response to detecting a thermal asperity at the first track, skip a predetermined number of tracks in the first direction to a second track, and sense for the thermal asperity while sequentially scanning the plurality of tracks beginning with the second track in a second direction opposite the first direction. The controller is further configured to halt the scanning at a third track in response to detecting the thermal asperity at the third track, and log the first and third tracks as tracks between which the thermal asperity is located.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Figure 1:
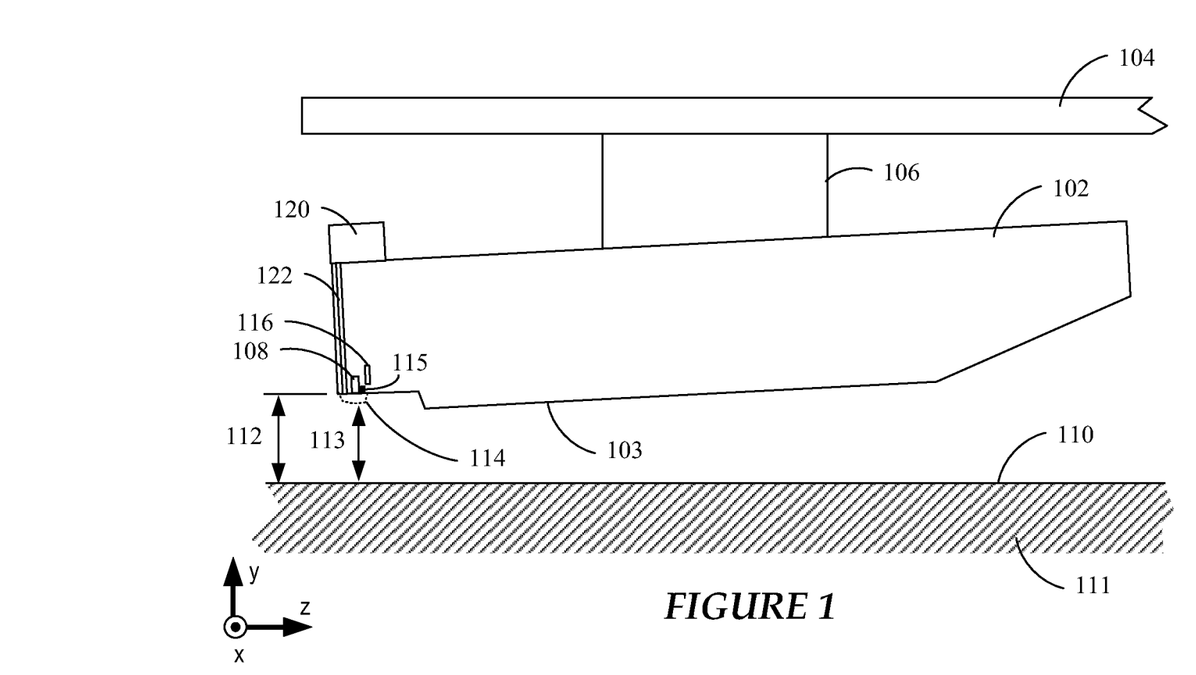
FIG. 1 is a side view of a slider configured for heat-assisted magnetic recording (HAMR) with which embodiments of the present disclosure can be implemented.

Referring now to FIG. 1, a block diagram shows a side view of a slider 102 according to a representative embodiment. The slider 102 may be used in a magnetic data storage device, e.g., a hard disk drive. The slider 102 may also be referred to as a recording head or a read/write head, etc. The slider 102 is coupled to an arm 104 by way of a suspension 106 that allows some relative motion between the slider 102 and arm 104. The slider 102 includes read/write transducers 108 at a trailing edge that are held proximate to a surface 110 of a magnetic recording medium 111, e.g., magnetic disk. The slider 102 shown in FIG. 1 is configured as a HAMR recording head, which includes a laser 120 (or other energy source) and a waveguide 122. The waveguide 122 delivers light from the laser 120 to optical components (e.g., a near-field transducer) near the read/write transducers 108.

When the slider 102 is located over a surface 110 of a recording medium 111, a flying height 112 is maintained between the slider 102 and the surface 110 by a downward force of arm 104. This downward force is counterbalanced by an air cushion that exists between the surface 110 and an air bearing surface 103 (also referred to as a "media-facing surface") of the slider 102 when the recording medium 111 is rotating. It is desirable to maintain a predetermined slider flying height 112 over a range of disk rotational speeds during both reading and writing operations to ensure consistent performance.

Region 114 is a "close point" of the slider 102, which is generally understood to be the closest spacing between the read/write transducers 108 and the magnetic recording medium 111, and generally defines the head-to-medium spacing 113. To account for both static and dynamic variations that may affect slider flying height 112, the slider 102 may be configured such that a region 114 of the slider 102 can be configurably adjusted during operation in order to finely adjust the head-to-medium spacing 113. This is shown in FIG. 1 by a dotted line that represents a change in geometry of the region 114. In this example, the geometry change may be induced, in whole or in part, by an increase or decrease in temperature of the region 114 via a heater 116. A thermal sensor 115 is shown situated at or near the close point 114 (e.g., adjacent the read/write transducers 108, such as near the near-field transducer) or can be positioned at other locations of the ABS 103 where protrusion of the ABS 103 is to be measured.

Figure 2:
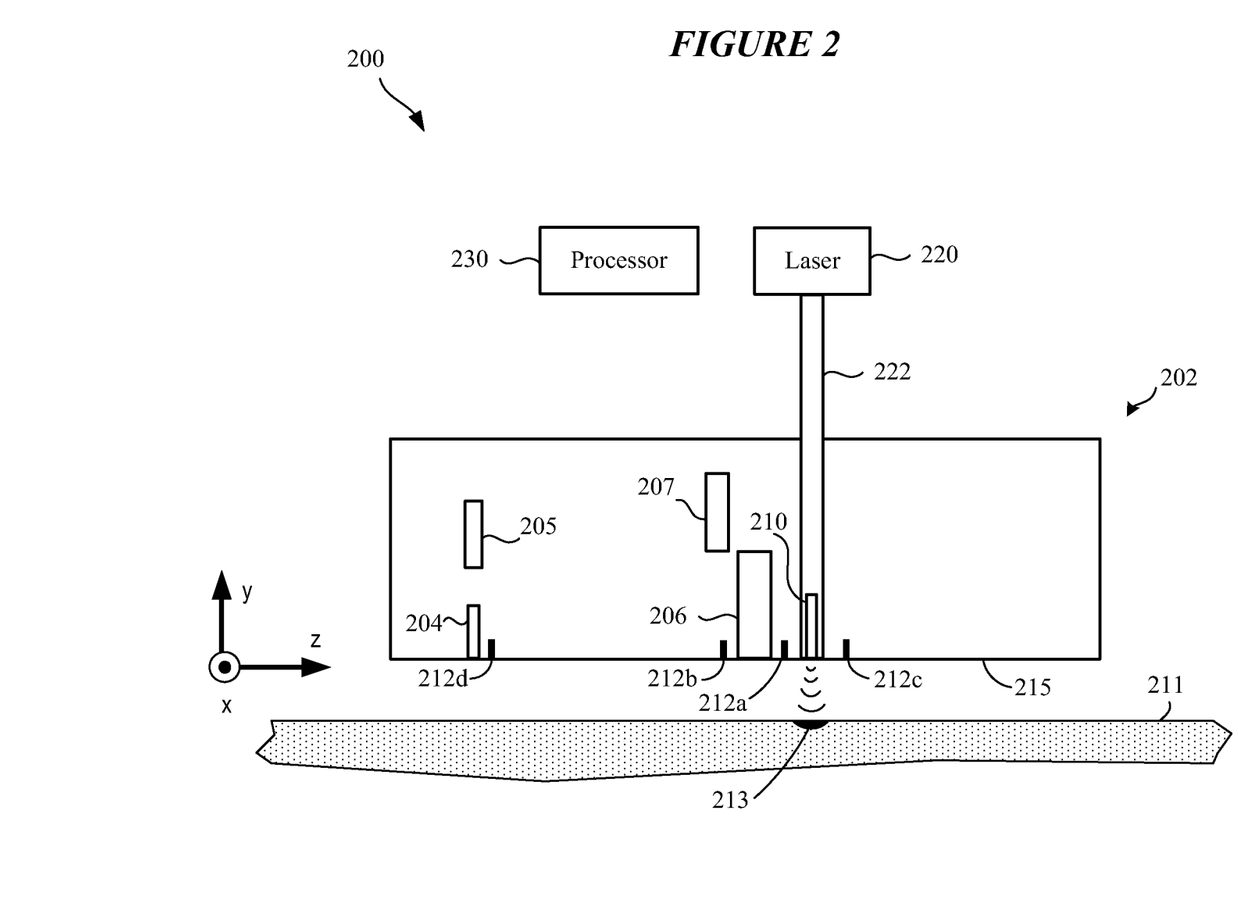
FIG. 2 is a perspective view of a slider configured for HAMR in accordance with various embodiments.

FIG. 2 shows a recording head arrangement 200 in accordance with various embodiments. More particularly, the recording head arrangement 200 is configured as a HAMR device. The recording head arrangement 200 includes a slider 202 positioned proximate a rotating magnetic medium 211. The slider 202 includes a reader 204 and a writer 206 proximate the ABS 215 for respectively reading and writing data from/to the magnetic medium 211. The writer 206 is located adjacent a near-field transducer (NFT) 210 which is optically coupled to a light source 220 (e.g., laser diode) via a waveguide 222. The light source 220 can be mounted external, or integral, to the slider 202. The light source 220 energizes the NFT 210 via the waveguide 222. The writer 206 includes a corresponding heater 207, and the reader 204 includes a corresponding heater 205 according to various embodiments. The writer heater 207 can be powered to cause protrusion of the ABS 215 predominately in the ABS region at or proximate the writer 206 (e.g., writer close point), and the reader heater 205 can be powered to cause protrusion of the ABS 215 predominately in the ABS region at or proximate the reader 204 (e.g., reader close point). Power can be controllably delivered independently to the heaters 207 and 205 to adjust the fly height (e.g., clearance) of the slider 202 relative to the surface of the recording medium 211.

FIG. 2 further shows a thermal sensor 212 situated at various locations on the slider 202 at or near the ABS 215. In general, one or more thermal sensors 212 can be situated at locations of the slider 202 where a protrusion of the ABS 215 is to be measured. In some embodiments, a thermal sensor 212a can be situated adjacent the NFT 210 (e.g., between the NFT 210 and the write pole of the writer 206). In some embodiments, the thermal sensor 212a can be located between about 2 and 5 μm from the NFT 210 (or the laser focus location), such as between about 2 and 3 μm. In other embodiments, the thermal sensor 212a can be located as much as about 10 μm from the NFT 210 or the laser focus location.

In other embodiments, a thermal sensor 212b can be situated adjacent the write pole of the writer 206 on the side opposite that nearest the NFT 210. In further embodiments, a thermal sensor 212c can be situated adjacent the waveguide 222 on the side opposite that nearest the NFT 210. Yet in other embodiments, a thermal sensor 212d can be situated adjacent the reader 204. It is understood that a single or multiple thermal sensors 212 may be provided/distributed on the slider 202. The thermal sensor 212 can have a width of between about 0.5 and 10 μm, such as about 1.5 μm. It is further understood that the thermal sensors can be implemented in a variety of technologies, such as resistance thermal sensors, thermistors, and thermocouples, for example.

Certain embodiments disclosed herein are directed to sensors having a temperature coefficient of resistance (referred to herein as TCR sensors). It is understood that other forms and/or means of sensing temperature are contemplated. In some embodiments, existing components of the slider 202 can be used as a thermal sensor. The reader 204 or NFT 210, for example, can be used as thermal sensors rather than or in addition to one or more dedicated thermal sensors.

Some of the TCR sensors described herein are referred to as Differential-Ended Thermal Coefficient of Resistance (DETCR) sensors. A DETCR sensor is configured to operate with each of its two electrical contacts (i.e., ends) connected to respective bias sources provided by a pair of electrical bond pads of the slider 202. Another example of a TCR sensor is a ground-split (GS) temperature coefficient of resistance sensor, in which one end of the GSTCR is coupled to ground and the other is coupled to a bias source via an electrical bond pad of the slider 202.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hotspot 213 over the track of the magnetic medium 211 where writing takes place, as shown in FIG. 2. The light from the source 220 propagates to the NFT 210, e.g., either directly from the source 220 or through the mode converter or by way of a focusing element. Other optical elements, such as couplers, mirrors, prisms, etc., may also be formed integral to the slider.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 213 is on the order of 50 nm or less. Thus, the desired hot spot size is well below half the wavelength of the light. Optical focusers cannot be used to obtain the desired hot spot size, being diffraction limited at this scale. As a result, the NFT 210 is employed to create a hotspot on the media.

The NFT 210 is a near-field optics device configured to generate local surface plasmon resonance at a designated (e.g., design) wavelength. The NFT 210 is generally formed from a thin film of plasmonic material (e.g., gold, silver, copper) on a substrate. In a HAMR slider 202, the NFT 210 is positioned proximate the write pole of the writer 206. The NFT 210 is aligned with the plane of the ABS 215 parallel to the read/write surface of the magnetic medium 211. The NFT 210 achieves surface plasmon resonance in response to the incident electromagnetic energy. The plasmons generated by this resonance are emitted from the NFT 210 towards the magnetic medium 211 where they are absorbed to create the hotspot 213. At resonance, a high electric field surrounds the NFT 210 due to the collective oscillations of electrons at the metal surface (e.g., substrate) of the magnetic medium 211. At least a portion of the electric field surrounding the NFT 210 tunnels into, and gets absorbed by, the magnetic medium 211, thereby raising the temperature of the spot 213 on the medium 211 as data is being recorded.

FIG. 2 also shows a processor 230 which is coupled to slider 202. The processor 230 can also be coupled to other components of the HAMR device/drive (e.g., read/write channel, voice coil motor, spindle motor, etc.). The processor 230 is configured to cooperate with the slider 202 to implement a thermal asperity detection methodology in accordance with various embodiments.

During manufacturing of a hard disk drive, thermal asperities and other defects of a magnetic recording medium are detected and mapped out in order to prevent recording head from accessing these defective regions of the disk during normal drive usage. Although detection of thermal asperities (TAs) is important to drive reliability, thermal asperity detection is intrinsically harmful to the drive. More particularly, contact between a recording head and a thermal asperity during TA detection/mapping causes burnish and wear of the head's transducers (e.g., writer, NFT, reader). Such deleterious contact between a recording head and a thermal asperity can lead to head instability, reduced drive yield during manufacturing, and degraded reliability during the service life of the drive. Contact between a recording head and a thermal asperity is particularly harmful to a HAMR head due to the increased TPI and decreased head-disk clearance. As the density of data tracks increases and head-disk clearance decreases, the frequency of head-TA contact increases as does head sensitivity to contact-induced failures.

Figure 3A:
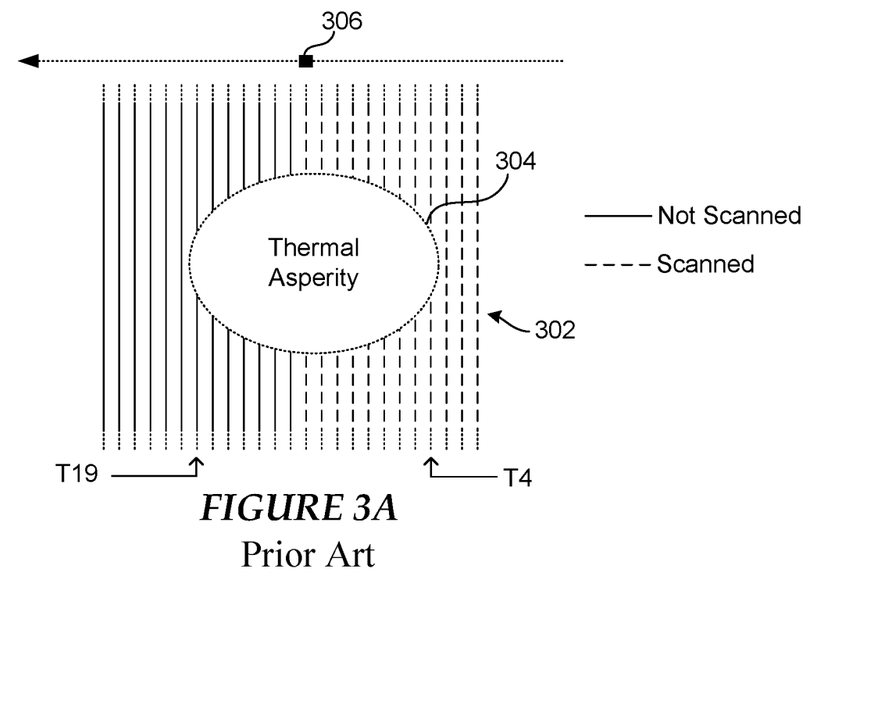
FIGS. 3A in 3B show a conventional thermal asperity detection scheme for purposes of illustration.
Figure 3B:
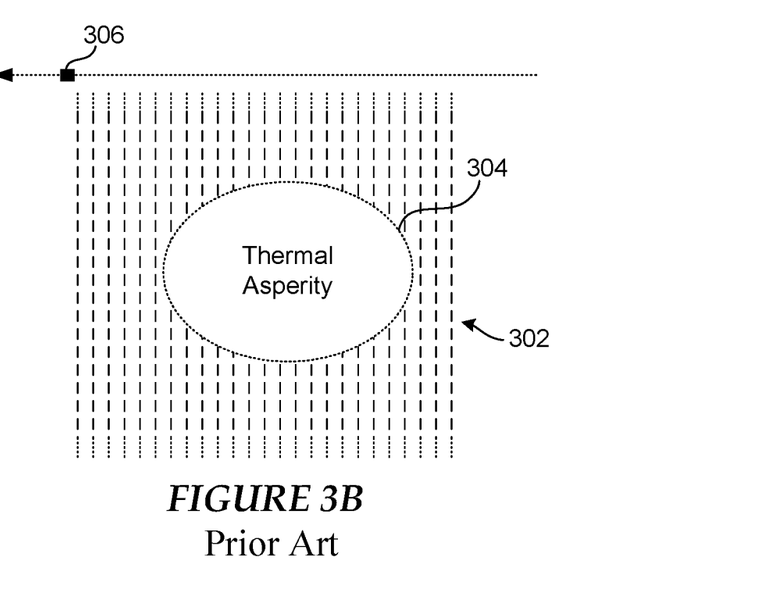

Turning now to FIGS. 3A in 3B, there is illustrated a conventional thermal asperity detection scheme for purposes of illustration. In FIGS. 3A and 3B, the dashed lines represent tracks that have been scanned, and the solid lines represent tracks that have not yet been scanned. During a conventional thermal asperity detection procedure, the recording head 306 is held at functioning clearance and positioned at the outer diameter of the recording medium. The head 306 is moved sequentially across the medium and each track 302 is scanned for thermal asperities until the inner diameter of the medium is reached.

Referring to FIG. 3A, the head 306 is shown sequentially scanning each track 302 until a thermal asperity 304 is contacted at track T4. It can be seen that the thermal asperity 304 spans a number of tracks 302. In the representative example shown in FIGS. 3A and 3B, the thermal asperity 304 spans 16 tracks 302 from track T4 to track T19. After initially detecting the thermal asperity 304 at track T4, each subsequent track that contains the thermal asperity 304 is scanned, resulting in repeated contact between the recording head 306 and the thermal asperity 304. In the example shown in FIGS. 3A and 3B, the head 306 contacts the thermal asperity 304 at least 16 times as the head 306 traverses the entirety of the thermal asperity 304. After detecting the thermal asperity 304, all subsequent tracks 302 are sequentially scanned until the entire surface of the medium has been scanned for thermal asperities, as is shown in FIG. 3B. Each time a thermal asperity 304 is detected as the head 306 traverses the surface of the recording medium, all tracks that contain the thermal asperity 304 are scanned, resulting in additional head-TA contact events at each thermal asperity location.

After a thermal asperity 304 has been detected, its location is recorded and the recorded thermal asperity sites are revisited track-by-track by the head 306 in a subsequent procedure for classifying the severity of the thermal asperity in terms of defect area and height. This classification procedure requires scanning of all tracks at which the detected thermal asperity 304 is located. In the representative example shown in FIGS. 3A and 3B, the classification procedure would require rescanning of the 16 tracks across which the thermal asperity 304 spans, resulting in an additional 16 contact events with for recording head 306. It can be appreciated that a typical recording medium will contain a multitude of thermal asperities 304, and that repeated contact with these thermal asperities causes significant burnish and wear of the transducers of the recording head.

Figure 4:
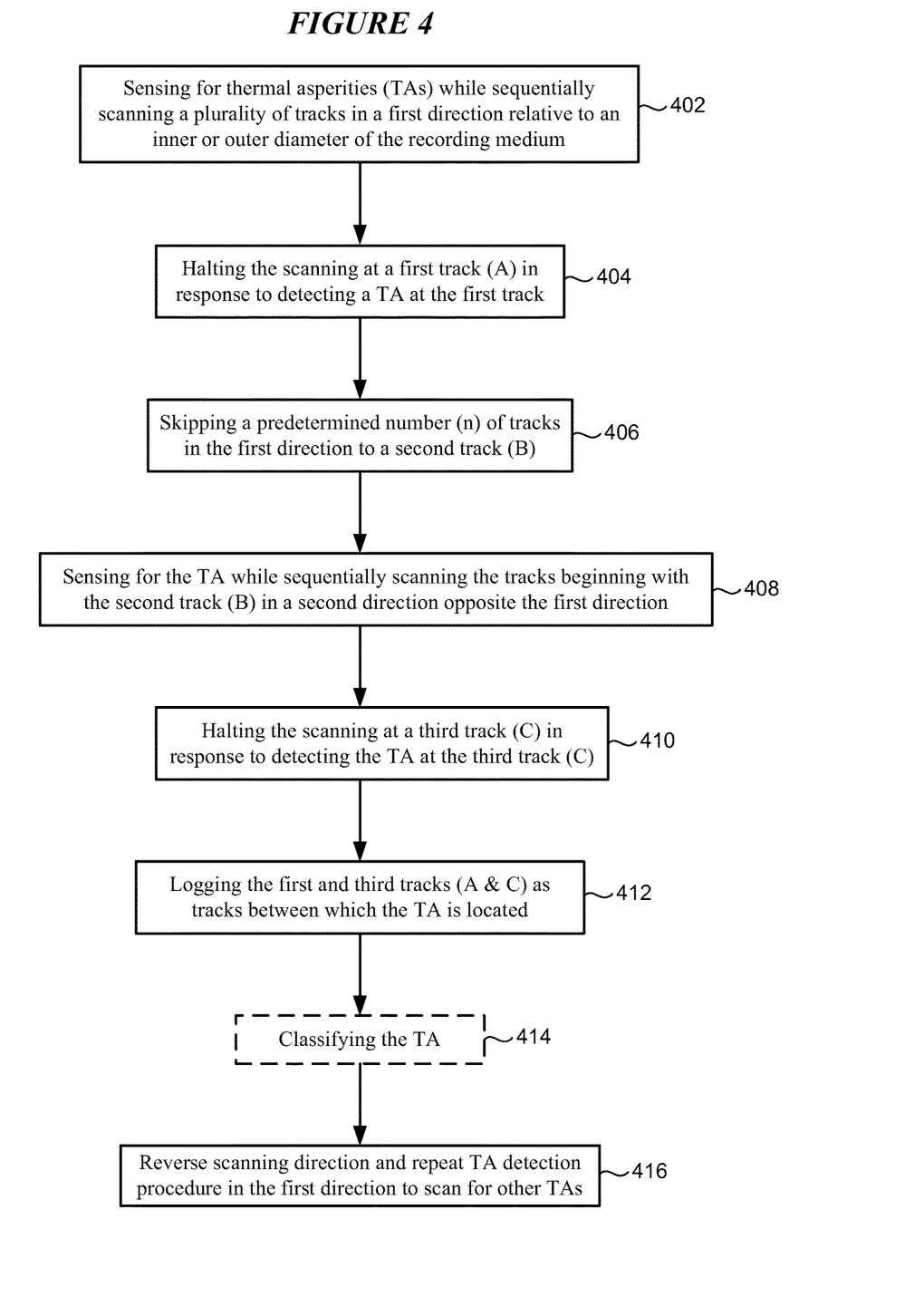
FIG. 4 illustrates a method of detecting thermal asperities of a magnetic recording medium in accordance with various embodiments.

FIG. 4 illustrates a method of detecting thermal asperities of a magnetic recording medium in accordance with various embodiments. The method shown in FIG. 4 involves sensing 402 for thermal asperities while sequentially scanning a plurality of tracks in a first direction relative to an inner or outer diameter of the recording medium. The method involves halting 404 the scanning at a first track (A) in response to detecting a thermal asperity at the first track. The method also involves skipping 406 a predetermined number (n) of tracks in the first direction to a second track (B). The method further involves sensing 408 for the thermal asperity while sequentially scanning the tracks beginning with the second track (B) in a second direction opposite the first direction. The method further involves halting 410 the scanning at a third track (C) in response to detecting the same thermal asperity at the third track (C). The method also involves logging 412 the first and third tracks (A & C) as tracks between which the thermal asperity is located.

According to some embodiments, the method involves classifying 414 the thermal asperity, such as by scanning a fourth track (D) halfway between the first and third tracks (A & C). After detecting and optionally classifying the thermal asperity, sequential scanning in the first direction resumes beginning with the second track (B) or, alternatively the track adjacent the third track (C). Additional details of the method of FIG. 4 will be described hereinbelow with reference to FIGS. 6A-6F. It is understood that the method shown in FIG. 4 can be used to detect other types of recording media defects, such as voids.

Figure 5:
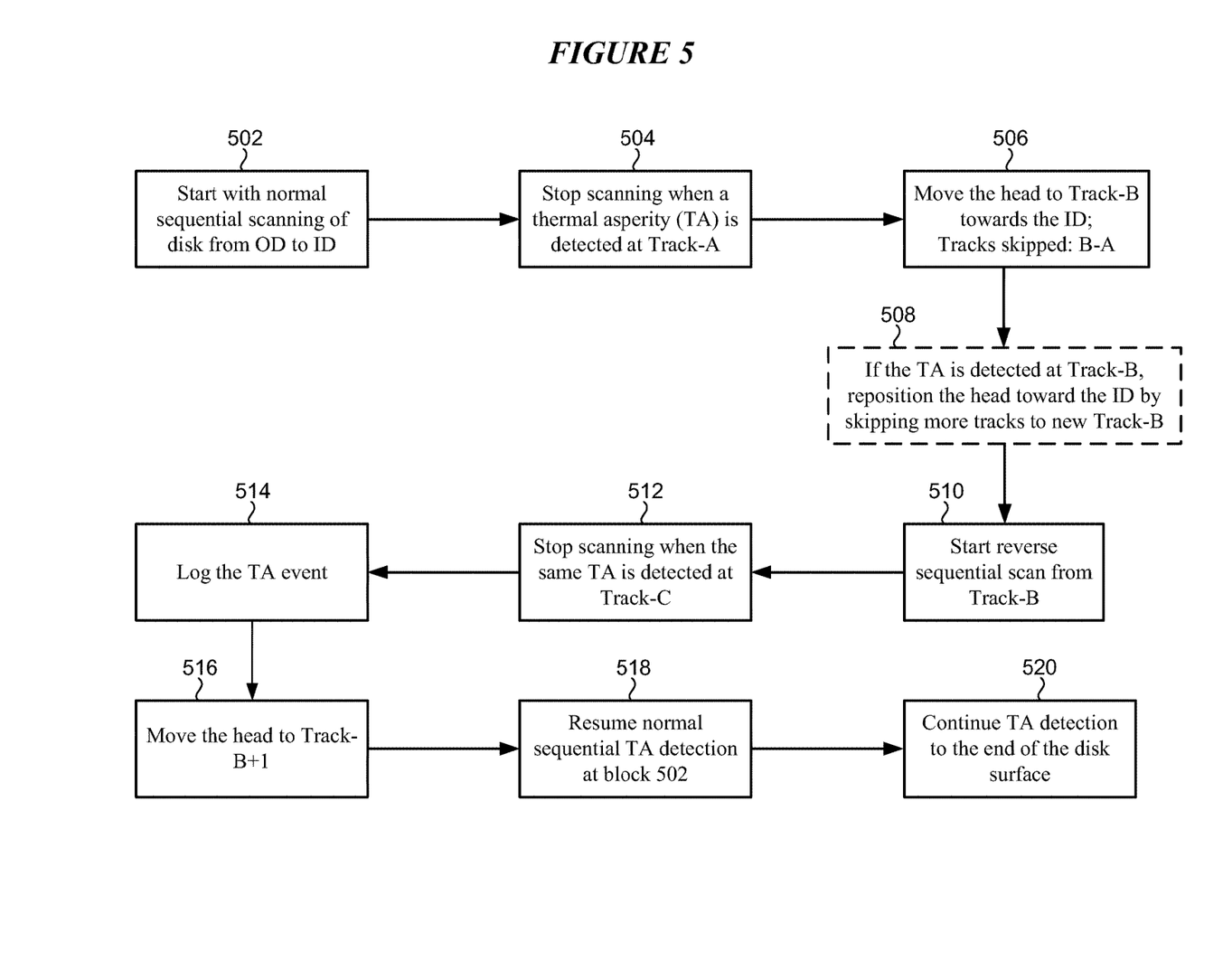
FIG. 5 illustrates a method of detecting thermal asperities of a magnetic recording medium in accordance with various embodiments.

FIG. 5 illustrates a method of detecting thermal asperities of a magnetic recording medium in accordance with other embodiments. The method shown in FIG. 5 starts with normal sequential scanning 502 of a magnetic recording disk initiated at the outer diameter of the disk and moving towards the inner diameter of the disk. Scanning is stopped 504 when a thermal asperity is detected at the first track (Track-A). The recording head is moved 506 to a second track (Track-B) in a direction towards the inner diameter of the disk. The total number of tracks skipped is equal to the difference between the second track and the first track (B-A). If the thermal asperity is detected 508 at the second track (Track-B), the head is repositioned towards the inner diameter by skipping more tracks to locate the head at a new second track (also referred to as Track-B for consistency).

The direction of sequential scanning is reversed 510 at the second track (Track-B), and scanning of tracks continues until the same thermal asperity is detected 512 at a third track (Track-C), at which point scanning is stopped. The thermal asperity event is logged 514, such as by recording the first and third tracks (Track-A and Track-B). In some embodiments, in addition to recording the first and third tracks, all tracks between the first and third tracks are recorded. The head is moved 516 to the track adjacent the second track (Track B+1). Normal sequential thermal asperity detection resumes 518 in the manner described previously staring at block 502, and the processes shown in FIG. 5 are repeated to continue 520 thermal asperity detection over the entire surface of the disk until the inner diameter of the disk is reached. It is understood that the scanning procedure illustrated in FIG. 5 can be initiated at the inner diameter of the recording disk and proceed to the outer diameter according to some embodiments. It is also understood that the method shown in FIG. 5 can be used to detect other types of recording media defects, such as voids.

FIGS. 6A-6F illustrate different phases of a thermal asperity detection methodology in accordance with various embodiments. The scanning approach depicted in FIGS. 6A-6E is consistent with the methodologies described previously with reference to FIGS. 4 and 5. For purposes of illustration, 25 tracks 602 of a magnetic recording medium are illustrated in FIGS. 6A-6E, with a thermal asperity 604 spanning across a number of the tracks 602. More specifically, the thermal asperity 604 is located between the $4^{th}$ track (T4) and the $19^{th}$ track (T19), thereby spanning 16 tracks of the medium. The number of tracks 602 and location of the thermal asperity 604 shown in FIGS. 6B-6E are the same as that shown in FIG. 6A for consistency.

Figure 6A:
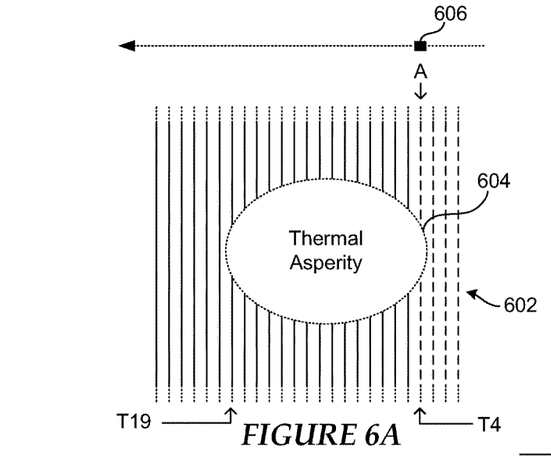
FIGS. 6A-6F illustrate different phases of a thermal asperity detection methodology in accordance with various embodiments.

With reference to FIG. 6A, a recording head 606 (e.g., a HAMR head) is shown sequentially scanning a number of tracks 602 of a magnetic recording medium in a first direction (e.g., from the outer diameter towards the inner diameter of the medium). The recording head 606 includes a contact sensor situated at a close point of the recording head 606 and configured to sense thermal asperities. For example, the contact sensor can be a thermal sensor, such as a DETCR. As the recording head 606 is moved in the first direction (right to left in FIG. 6A) across the medium, each track 602 is scanned to sense for thermal disk asperities. As shown in FIG. 6A, the first three tracks 602 are scanned (indicated by dashed lines) without detecting a thermal asperity. While scanning the fourth track (shown as Track-A), a thermal asperity 604 is detected. Upon detecting the thermal asperity 604 at Track-A, scanning of the tracks is halted.

Figure 6B:
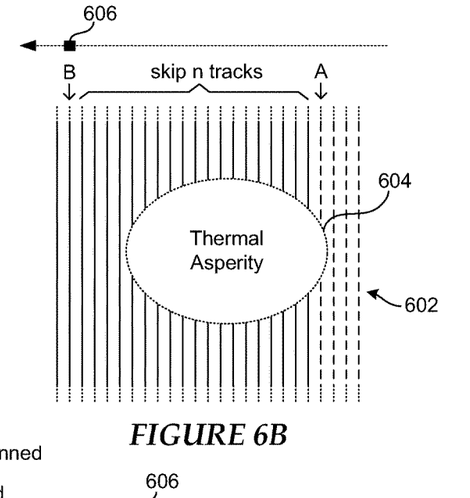

Instead of continuing to sequentially scan subsequent tracks that contain the thermal asperity 604 (e.g., tracks between tracks T4 and T19), a predetermined number (n) of tracks are skipped without scanning the skipped tracks. As is shown in FIG. 6B, the head 606 is moved from Track-A to Track-B without scanning the intervening tracks. The predetermined number (n) of tracks that are skipped is based on an estimated size (e.g., area) of the thermal asperities for a particular magnetic recording medium. For example, the predetermined number (n) of tracks skipped can be based on statistical thermal asperity size distribution data for the medium (e.g., mean+3 sigma). Preferably, the predetermined number of skipped tracks is chosen so that the recording head 606 is moved beyond the thermal asperity 604 by one or more tracks. If, however, the head 606 is not moved beyond the thermal asperity 604 after skipping the predetermined number (n) of tracks, the head 606 is moved a second predetermined number (m) of tracks, where the second predetermined number (m) can be the same as or less than the original predetermined number (n) of tracks (e.g., m=n/2).

Figure 6C:
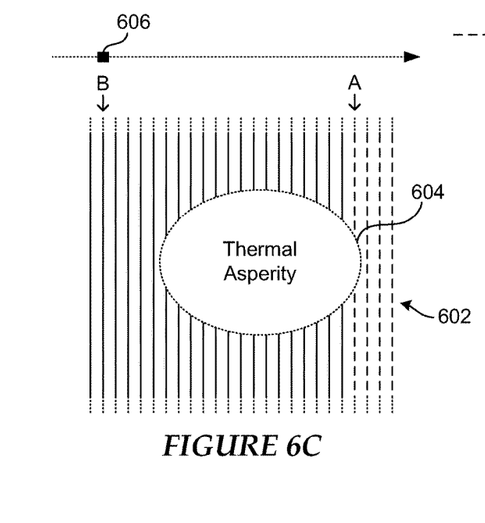
Figure 6D:
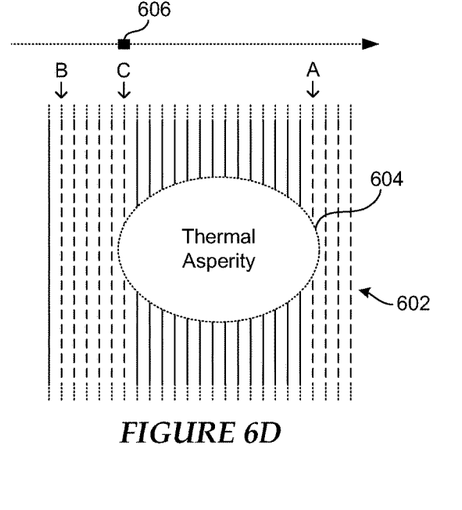

After moving the head 606 to Track-B, and as shown in FIG. 6C, the scanning direction is reversed and the head 606 is moved in the reverse direction (left to right in FIG. 6C). As is shown in FIG. 6D, sequential scanning of individual tracks resumes beginning at Track-B as the recording head 606 progresses towards the thermal asperity 604. The head 606 detects the same thermal asperity 604 while scanning Track-C. Upon detecting the thermal asperity 604 at Track-C, scanning of the tracks is halted. The thermal asperity event can be logged, such as by recording details of Tracks-A and Tracks-C between which the thermal asperity 604 is located. For example, Track-A, Track-C, and all intervening tracks can be recorded as tracks that contain the thermal asperity 604.

It can be seen in the illustrative example shown in FIGS. 6A-6D that repetitive deleterious contact between the recording head 606 and the thermal asperity 604 is avoided using a discontinuous two-direction thermal asperity detection methodology. In this illustrative example, only 2 scans are needed to detect the thermal asperity 604, from which the size (e.g., width) of the thermal asperity 604 can be determined. Notably, 14 head-TA contact events are avoided during the scanning procedure when using a thermal asperity detection methodology of the present disclosure rather than a conventional approach. Moreover, obviating the scanning of skipped tracks reduces the time required to perform the thermal asperity detection scanning procedure. The time savings due to skipping tracks that contain thermal asperities depends on several factors, including the total number of thermal asperities on a medium and the recording density of the medium.

Figure 6E:
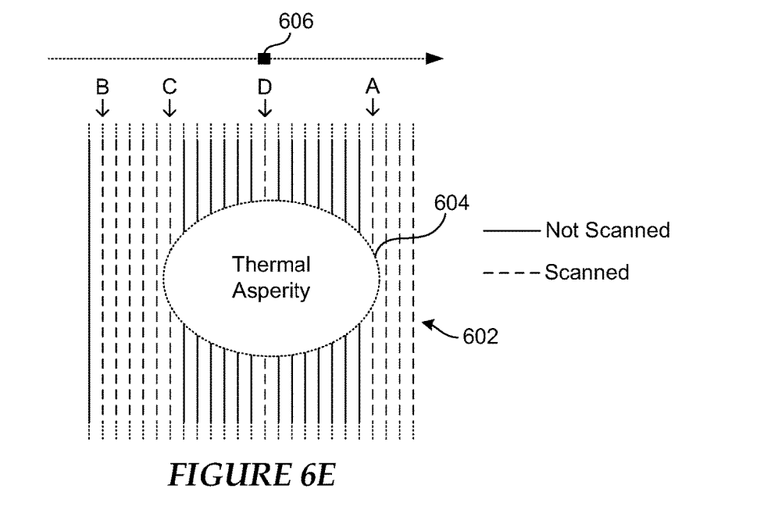

After detecting the thermal asperity 604, a procedure can be implemented to classify the thermal asperity 604. For example, and with reference to FIG. 6 E, the recording head 606 can be moved to a track (Track-D) between the two tracks (Track-A and Track-C) that bound the thermal asperity 604. For example, the head 606 can be moved to a track (Track-D) that is about halfway between the two tracks (Track-A and Track-B) that bound the thermal asperity 604. It is noted that a thermal asperity typically protrudes higher at a middle cross-track region relative to peripheral regions. With the head 606 positioned at Track-D, this track is scanned to classify the thermal asperity 604. For example, the relative height of a thermal asperity 604 can be measured by positioning the head 606 at the center region (e.g., along Track-D) of the thermal asperity 606.

It is noted that a conventional thermal asperity classification approach involves scanning each track (e.g., 16 tracks) at which the thermal asperity 606 is located, resulting in multiple contact events between the head 606 and the thermal asperity 604. In contrast to a conventional approach, the thermal asperity 604 can be classified using a single scan along a single track (Track-D) using a thermal asperity classification methodology according to various embodiments. It is noted that scanning only the center track to measure the relative height of the thermal asperity may lose some classification accuracy, but this is typically not significant as thermal asperity classification to strategically less important than thermal asperity detection. Thermal asperity classification provides relative information, while thermal asperity detection implicates drive self-protection and is directly related to better yield and reliability.

Figure 6F:
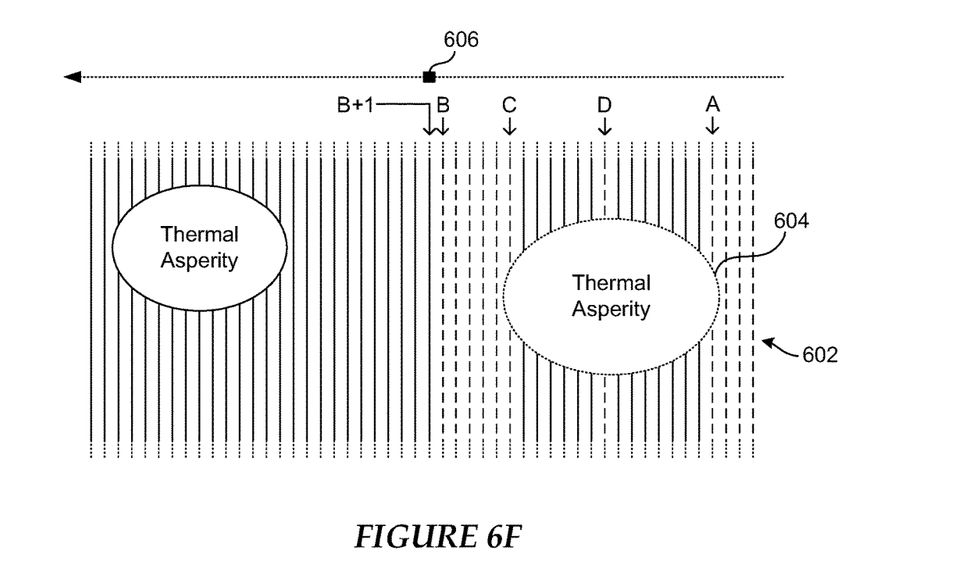

Having detected the thermal asperity 604 and optionally characterized the thermal asperity 604, the scanning direction is reversed and the head 606 is positioned at the unscanned track (Track-B+1) adjacent Track-B as is shown in FIG. 6F. Sequential scanning of the tracks 602 subsequent to the Track-B+1 resumes in an attempt to detect other thermal asperities of the medium. FIG. 6F shows a second thermal asperity which can be detected and characterized in a manner previously discussed with reference to FIGS. 6A-6E. The discontinuous two-direction thermal asperity detection methodology is repeated until the head 606 reaches the inner diameter of the medium, at which point the entire surface of the medium has been subject to thermal asperity detection and characterization.

Figure 7:
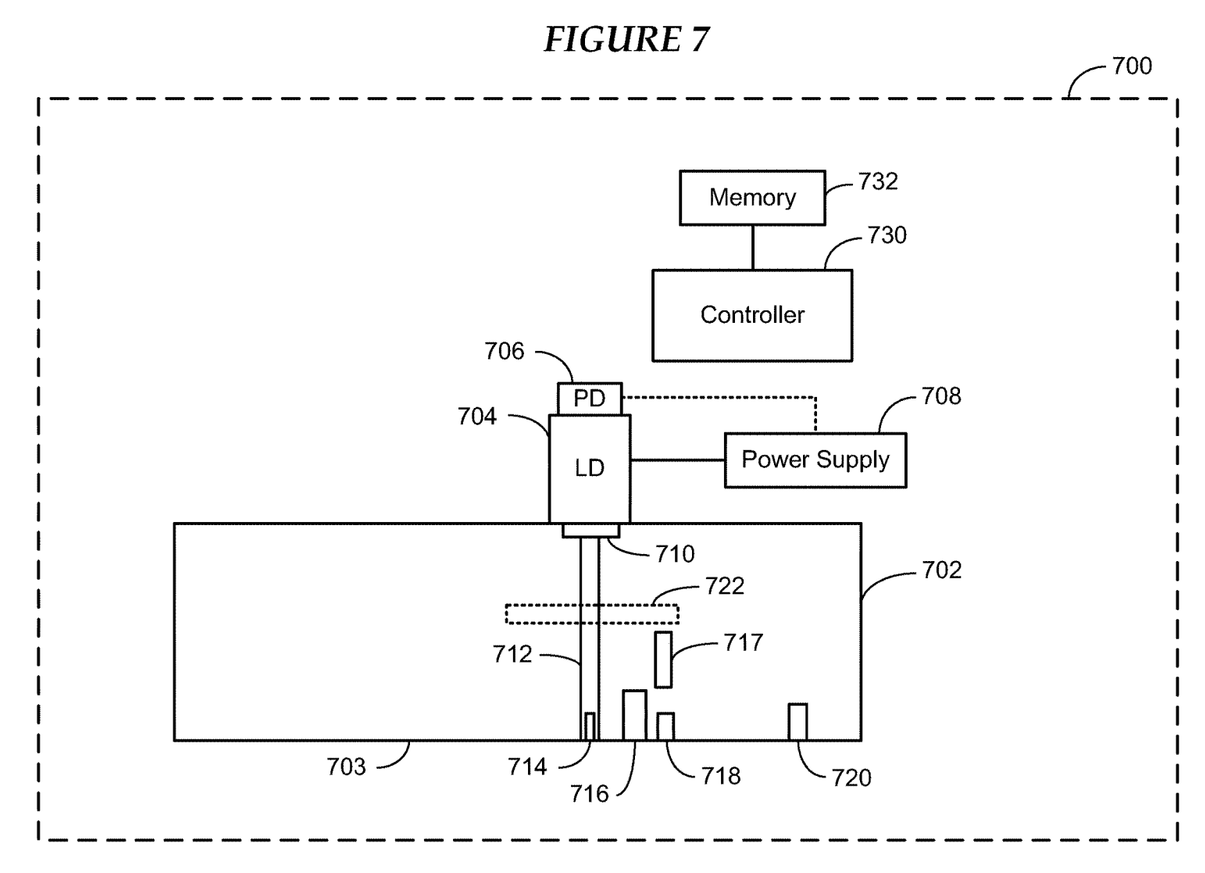
FIG. 7 is a block diagram of a system for implementing thermal asperity detection inside a HAMR drive in accordance with various embodiments.

FIG. 7 is a block diagram of a system for implementing thermal asperity detection inside a HAMR drive in accordance with various embodiments. FIG. 7 shows a portion of a HAMR drive 700 which includes a slider 702 on which a laser diode 704 is mounted. A photodetector 706 is mounted on or in close proximity to the laser diode 704. A power supply 708 is coupled to the laser diode 704 and provides a supply current to the laser diode 704. An output of the photodetector 706 is coupled to the power supply 708. The power supply 708 can adjust the bias current supplied to the laser diode 704 in response to the photodetector output.

The slider 702 includes a number of components including an optical waveguide 712 which is optically coupled to the laser diode 704 via an optical coupler 710. The optical waveguide 712 extends from the optical coupler 710 to the NFT 714 situated at the air bearing surface 703 proximate the optical waveguide 712. In some embodiments, a bolometer 722 is situated proximate the optical waveguide 712. A writer 716 is situated proximate the NFT 714. A heater 717 is situated proximate the writer 716 and configured to thermally actuate the writer 716.

A contact sensor 718 (e.g., DETCR) is situated proximate the writer 716 and NFT 714 (e.g., at a close point of the writer). In some embodiments, the contact sensor 718 can be located on the opposite side of the waveguide 712. A reader 720 is shown positioned away from the writer 716 and the contact sensor 718. In some configurations, the contact sensor 718 can be situated equidistant from the writer 716 and the reader 720.

The HAMR drive 700 further includes a controller (e.g., processor) 730 coupled to a memory 732. As shown in FIG. 7, the controller 730 receives a number of inputs from the various components of the slider 702 and other components of the drive 700. For example, the controller 730 receives an output from the contact sensor 718 and is configured to perform the various thermal asperity detection and classification methodologies disclosed hereinabove.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. All references cited within are herein incorporated by reference in their entirety.

What is claimed is:

1. A method, comprising:
sensing for thermal asperities while sequentially scanning a plurality of tracks of a magnetic recording medium in a first direction relative to an inner or outer diameter of the medium;
halting the scanning in the first direction at a first track in response to detecting a thermal asperity at the first track;
skipping a predetermined number of tracks in the first direction to a second track;
sensing for the thermal asperity while sequentially scanning the plurality of tracks beginning with the second track in a second direction opposite the first direction;
halting the scanning in the second direction at a third track in response to detecting the thermal asperity at the third track; and
logging the first and third tracks as tracks between which the thermal asperity is located.

2. The method of claim 1, wherein the second track is beyond the detected thermal asperity.

3. The method of claim 1, wherein the predetermined number of tracks skipped is based on an estimated size of the thermal asperities of the medium.

4. The method of claim 1, wherein the predetermined number of tracks skipped is based on statistical thermal asperity size distribution data for the medium.

5. The method of claim 1, wherein logging comprises logging the tracks between and including the first and third tracks as tracks at which the thermal asperity is located.

6. The method of claim 1, further comprising:
scanning a fourth track between the first and third tracks; and
classifying the thermal asperity at the fourth track.

7. The method of claim 6, wherein the fourth track is a track about halfway between the first and third tracks.

8. The method of claim 6, wherein classifying the thermal asperity at the fourth track comprises measuring a height of the thermal asperity at the fourth track.

9. The method of claim 1, further comprising repeating the method in the first direction beginning with a next track subsequent to the third track until a surface of the medium between the inner and outer diameters has been scanned.

10. The method of claim 1, wherein the method is performed for thermal asperities and voids of the medium.

11. An apparatus, comprising:
a recording head comprising a thermal asperity sensor configured to sense for thermal asperities of a magnetic recording medium moving relative to the head; and
a controller coupled to the head and configured to:
sense for the thermal asperities while sequentially scanning a plurality of tracks of the medium in a first direction relative to an inner or outer diameter of the medium;
halt the scanning in the first direction at a first track in response to detecting a thermal asperity at the first track;
skip a predetermined number of tracks in the first direction to a second track;
sense for the thermal asperity while sequentially scanning the plurality of tracks beginning with the second track in a second direction opposite the first direction;
halt the scanning in the second direction at a third track in response to detecting the thermal asperity at the third track; and
log the first and third tracks as tracks between which the thermal asperity is located.

12. The apparatus of claim 11, wherein the second track is beyond the detected thermal asperity.

13. The apparatus of claim 11, wherein the predetermined number of tracks skipped is based on an estimated size of the thermal asperities of the medium.

14. The apparatus of claim 11, wherein the predetermined number of tracks skipped is based on statistical thermal asperity size distribution data for the medium.

15. The apparatus of claim 11, wherein the controller is configured to log the tracks between and including the first and third tracks as tracks at which the thermal asperity is located.

16. The apparatus of claim 11, wherein the controller is configured to:
scan a fourth track between the first and third tracks; and
classify the thermal asperity at the fourth track.

17. The apparatus of claim 16, wherein the fourth track is a track about halfway between the first and third tracks.

18. The apparatus of claim 16, wherein the controller is configured to measure a height of the thermal asperity at the fourth track.

19. The apparatus of claim 11, wherein the controller is configured to sense and log tracks of the medium having thermal asperities and voids.

20. The apparatus of claim 11, wherein the head and the controller are incorporated in a heat-assisted magnetic recording device.

* * * * *